US012801736B2

(12) United States Patent
Wokaty, Jr. et al.

(10) Patent No.: US 12,801,736 B2
(45) Date of Patent: Nov. 17, 2026

(54) CONFIRMATION EXCEPTION METHODS FOR FRAUD PREVENTION

(71) Applicant: Capital One Services, LLC, McLean, VA (US)

(72) Inventors: Robert Dwane Wokaty, Jr., Glen Allen, VA (US); Michael Winfield Raymond, Doswell, VA (US); Jeffrey W. Edwards, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 88 days.

(21) Appl. No.: 18/982,092

(22) Filed: Dec. 16, 2024

(65) Prior Publication Data

US 2026/0170131 A1 Jun. 18, 2026

(51) Int. Cl.
*G06F 21/56* (2013.01)
*G06Q 20/40* (2012.01)

(52) U.S. Cl.
CPC ........ *G06F 21/56* (2013.01); *G06F 2221/034* (2013.01); *G06Q 20/407* (2013.01)

(58) Field of Classification Search
CPC .. G06F 21/56; G06F 2221/034; G06Q 20/407
See application file for complete search history.

(56) References Cited

U.S. PATENT DOCUMENTS

| | | | | |
|---|---|---|---|---|
| 11,386,198 | B1 * | 7/2022 | Opos | G06F 21/52 |
| 2017/0329615 | A1 * | 11/2017 | Kahn | G06Q 20/12 |
| 2022/0343299 | A1 * | 10/2022 | Standard | G06Q 20/3223 |

OTHER PUBLICATIONS

"Coding a cancel button," <<https://forum.arduino.cc/t/coding-a-cancel-button/568669>>, first date of publication unknown but, prior to Jul. 8, 2024, 4 pages.
"Send or unsend Gmail messages," <<https://support.google.com/mail/answer/2819488?hl=en&co=GENIE.Platform%3DDesktop>>, first date of publication unknown but, prior to Jul. 8, 2024, 2 pages.

* cited by examiner

*Primary Examiner* — Brian Whipple
(74) *Attorney, Agent, or Firm* — Banner & Witcoff, Ltd.

(57) ABSTRACT

Systems, methods, and apparatuses are described for delaying and providing reversibility to important tasks to avoid malicious activities during screen-sharing sessions. A user may share their screen with a malicious entity when conducting a task on a computing device. A method may be used on the computing device to monitor actions and prevent harm to the user. After detecting an unauthorized activity when the user is conducting the task, the user may receive a message informing the user that they may cancel the task within a first time period. If the user cancels the task within the first time period, the user may start conducting a new task. The user may receive a new message that the user may cancel the new task within a second time period, longer than the first time period.

20 Claims, 5 Drawing Sheets

CONFIRMATION EXCEPTION METHODS FOR FRAUD PREVENTION

FIELD OF USE

Aspects of the disclosure relate generally to preventing malicious activities in conducting tasks. More particularly, aspects described herein describe a process for preventing malicious activities when a malicious entity gets access to a user's account.

BACKGROUND

Users of computing devices often rely on third parties for support when handling issues (e.g., computer issues, website issues, financial transaction issues). Those users might go online for that help by, for example, going to a website. Online services offer several advantages, such as ease of use, user-friendliness, and accessibility all year round.

A user may use an online service's website to conduct a task. The user may use an online education service to register for a course. For example, the user may be a university student who uses their university website to register for a few courses for a semester. In another example, the user may use an online forum on their university website to create a post regarding one of their class assignments and invite other users or students of the online forum to suggest solutions to the post. The user may be a resident of a district who may use a utility company's website to create an account using their electric meter information and later use the utility company's website to pay their electric bills. The resident may need to update their mailing address on the utility company's website to receive their electric bills in paper format. Using the utility company's website, the resident may use options to start or interrupt their electric service at their address in specific periods.

While conducting any of the tasks mentioned above, the user may need some help. For example, the resident may have a question on how to use the utility company's website to update their personal information, how to navigate through different options available on the utility company's website, how to set dates for interrupting and starting utility service when the customer is away, or how to update their payment information for an autopay option. The utility company may provide the user with such help by providing a chat box or a graphical user interface on the utility company's website. The user may send or receive a message through the graphical user interface and ask for help.

Although receiving online help has been proven effective in many instances, there are some associated concerns. For example, receiving online help is not immune to attacks by hackers. A hacker, for example, can penetrate the utility company's help portal on the utility company's website when the user asks for help. This way, the hacker may pretend to be a helper, and after receiving the user's trust, the hacker may ask for the user's personal information, and the user may share their personal information with the hacker.

In some instances, the user may accidentally allow the hacker to get control over the user's computing device, for example, a personal laptop. For example, when the user is busy searching for help, the hacker may send the user a prompt, a text box, a message, a link, or any combination thereof so that the user would respond to that. After the user clicks on a link, for example, sent by the hacker, the hacker gets control over the user's computing device. By receiving control over the user's computing device, the hacker may commit malicious activities such as stealing information, deleting information from the user's accounts, or moving some malicious files to the user's accounts.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein relate to delaying and providing reversibility to important computer interactions to avoid malicious activities during screen-sharing sessions. Users may routinely conduct tasks (e.g., modifying files, performing actions on websites, conducting transactions on online shopping platforms, sending messages) on computing devices. These tasks might also be performable by one or more second users that have access to the computing device via, for example, a screen sharing session or similar sharing session. For example, a user having difficulty with using operating system functions, like saving a file, may request an Information Technology (IT) staff member to help them perform those functions. That said, the power of those shared sessions have made them a valuable avenue of attack for malicious entities, as shared sessions (e.g., screen sharing sessions with a malicious party) can be used for a variety of malicious activities: stealing passwords or credit card numbers, adding or deleting files such as spyware, conducting unauthorized financial transactions, and the like. Such malicious entities might trick users into such shared sessions in a variety of ways: for example, through social engineering (e.g., false calls from IT, spear phishing), spam, the installation of spyware on the computing device through code vulnerabilities, or the like.

Methods described herein address these and other issues by implementing processes that limit the ability of malicious entities to conduct malicious functions, particularly at a high speed. Depending on the type of sharing session, the method may avoid any malicious activity by the malicious entity while sharing screen sessions. The kind of sharing sessions may be determined by the user, for example, when configuring software on their computer, signing up for an account on a website, or the like. According to an example, a third party may set the type of sharing sessions. According to another example, the user may adjust the level of sharing sessions in different scenarios. It will be understood that the type of sharing sessions may be adjusted depending on different preferences, determined either by the user, the third party, or the industry's norm.

After the user enters the required information for conducting a task on a website, a portal, or a graphical user interface, for example, the user may see a button to confirm the completion of the task. The confirmation may be clicking on a button that reads, for example, "send," "ok," or "acknowledge." After the user confirms that they will conduct the task, the user may see a message informing them that their request to conduct the task has been received and will be processed. According to an example, the message may indicate that the user may cancel the task within some period of time, such as the next 10 seconds. If the user cancels the task within the specified time, for example, 10 seconds, the task may be canceled, and the user may be required to start over to conduct the same task or another task. This cancellation process may be beneficial when the malicious entity has gained access to the user's computing device and has initiated the task and might not burden the user because, typically, a general user need not conduct a large number of tasks at high speed, meaning that the time delay might be acceptable to the user. Providing the user with the option to cancel the task may be beneficial if the malicious entity had initiated the task. Once canceled, the task might not be performable for some period of time (e.g., the next ten minutes), which might prevent the malicious entity from trying to retry the task that the user has already canceled quickly.

The wait time for successive tasks might be longer and longer such that, for example, if multiple important tasks are conducted in quick succession, users (e.g., the user of the computing device and/or malicious entities) might be forced to wait longer and longer for the tasks to be completed. For example, if the user cancels the task in the first place, the user may need to start over a new task. That new task might be associated with a greater wait time than any previous task. For example, a new message may inform the user that the user may cancel the new task within the next 20 seconds (that is, ten seconds greater than the previous task's wait time). If the user cancels the new task within the specified time of 20 seconds, the user may receive a request asking the user to contact a third party to verify their identity and ensure that someone other than the user is not trying to take over the user's account. For example, if the user cancels the new task, the user may see a pop-up message that informs the user that a hold has been placed on their account until specific information may be received by a third party. Putting a hold on the user's account until further information is obtained may prevent the malicious entity from saving the account information and logging online without the user's consent. Also, putting a hold on the user's account may prevent the malicious entity from interfering with the user's computing device, such as opening or running an application in the background.

Corresponding methods, apparatus, systems, and non-transitory computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
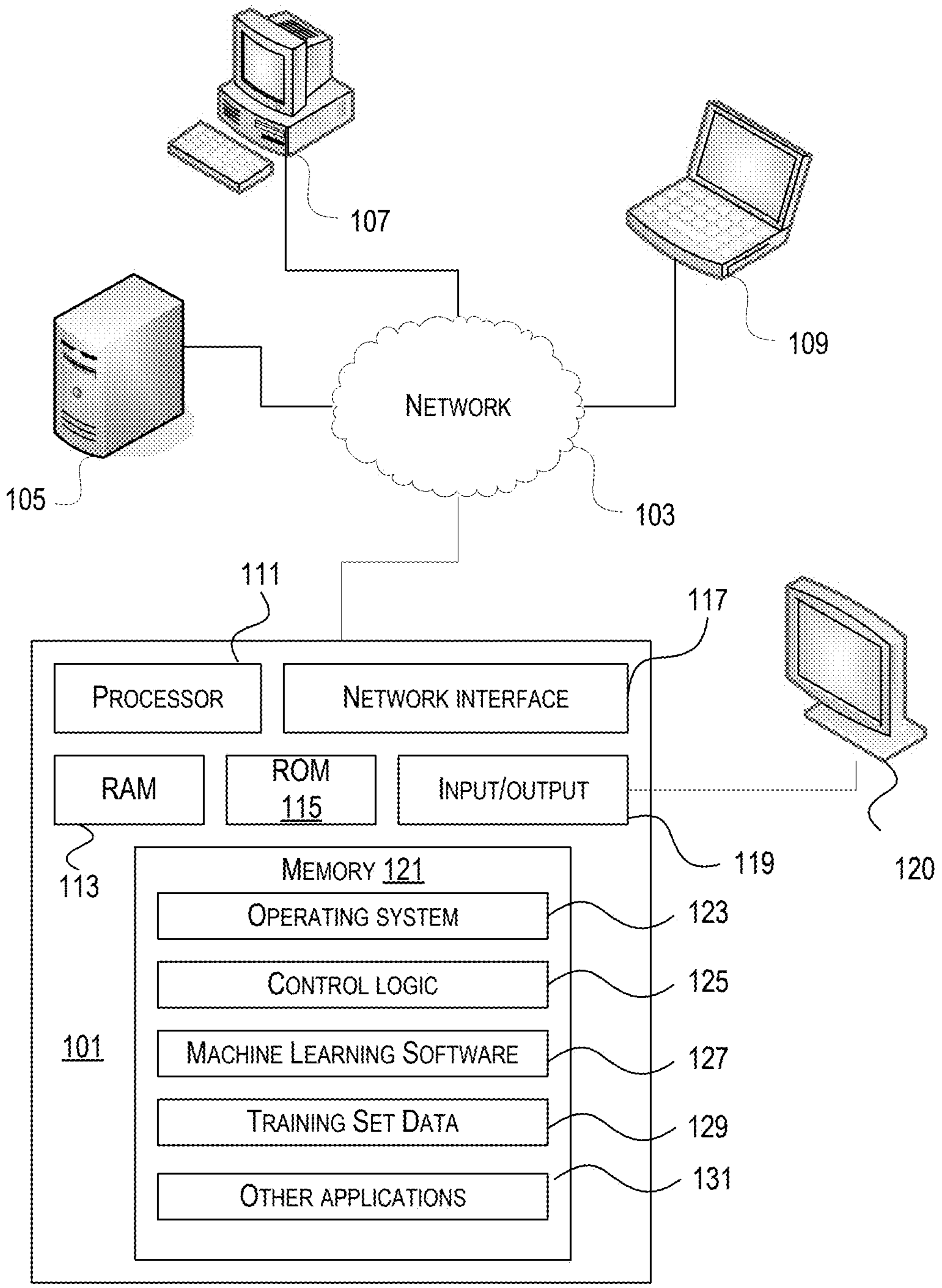
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, it can be frustrating, for example, when computer users want to use their online accounts to pay their electric bills on a utility company website. Still, they do not know where they may enter their information on the website. Sometimes, screen-sharing sessions may be helpful for getting some help to fill out the required information. The screen-sharing option may be used by some users who are ill-informed, uninformed, or careless when working with computers and websites. The user may find screen sharing to be the most straightforward solution and/or the least time-consuming method for finding answers to their questions. However, the user may share their screen with a malicious entity unbeknownst to the user. The malicious entity may implement various strategies to deceive the user to gain their trust and access the user's computing device through a screen-sharing session. For example, the malicious entity (1) may send a legitimately-looking prompt, telling the user that they may find their answers in the shortest amount of time if they share their screen, (2) may send a link to the user, asking the user to click on the link for a session of sharing-screen, (3) may send the user a well-designed but misleading graphical user interface to convince the user to follow a particular prompt.

After the user allows the malicious entity to access the user's computing device through the screen-sharing session, the malicious party may start a malicious activity on the computing device. The malicious activity may appear in different shapes and forms. In some instances, the malicious activity may be a fraudulent activity. For example, the malicious activity may be accessing some personal data of the user stored on the computing device, deleting some files from the computing device, moving some files to the computing device, sending a computer virus to the user's contacts, instantiating a financial transaction, or shopping online using a user's credit card. According to another example, the malicious activity may comprise hacking into the user's financial accounts. Another example of malicious activity may be sending inappropriate content to the user's contacts. As another example, the malicious activity may be any activity the user might not have consented to otherwise.

After the malicious entity starts the malicious activity, a message may appear on the user's computing device, informing the user that an unauthorized activity has been done on their computing device. The unauthorized activity may include the malicious activity conducted by the malicious entity. The message may inform the user that the user may cancel the unauthorized activity within a first time period. For example, the message may inform the user that the user may cancel the unauthorized activity within the next 10 seconds. Sometimes, 10 seconds may not be enough for the user to fully understand the message, think about the message, and decide whether the user wants to respond to the message to cancel the unauthorized activity. In some examples, the first time period may be longer than 10 seconds. For example, instead of 10 seconds, the user may be given 20 or 30 seconds to cancel the unauthorized activity. The first time period may be adjusted depending on some preferences associated with the user, the computing device, or any other related factor. The first time period may be adjusted based on predetermined settings in the computing device. According to an example, the first time period may be adjusted in association with the unauthorized activity. For example, if the unauthorized activity is regarding withdrawing money from one or more of the user's accounts, the first time period may be shortened to cause a faster response from the user in order to prevent harm.

According to an example, the message may be a pop-up notification. According to another example, the message, based on the unauthorized activity, may appear in different shapes and forms. For example, suppose the unauthorized activity is regarding some unauthorized financial activity conducted on the computing device. In that case, the message may be a visual notification accompanied by an audible sound generated by the computing device. In some examples, in addition to the message appearing on the user's computing device, e.g., a tablet, the message may also include a notification to a user's cell phone. The notification may be the same as the message. For example, suppose the unauthorized activity is about withdrawing money from one of the user's accounts. In that case, the message may be shown on the user's computing device and the cell phone. The message on the user's cell phone may be a visual notification accompanied by a tactile vibration or an audible sound.

The user may cancel the unauthorized activity after receiving the message on their computing device. The malicious entity may initiate a second malicious activity unbeknownst to the user. The second malicious activity may be the same as the malicious activity. In some instances, the second malicious activity may be different from the malicious activity. The malicious activity may have been submitting a request for a change in mailing address, while the second malicious activity may be sending money to a foreign account. When the second malicious activity is detected, the user may receive a second message informing the user that a second unauthorized activity has been detected. The second unauthorized activity may include the second malicious activity. The second message may be similar to the first message. According to an example, the second message may be different from the first message. The second message may inform the user that the user has the option to cancel the second unauthorized activity within a second time period. The second time period may be longer than the first time period. For example, if the first time period was 10 seconds, the second time period may be 30 seconds. The second time period may be longer than the first time, causing doubt in the user's ability to examine the situation more carefully.

The second message may be different from the message. When the user responds to the second message and cancels the second unauthorized activity, the user may see a prompt on their computing device that a hold has been placed on their accounts related to the second unauthorized activity. For example, if the second unauthorized activity was about withdrawing an amount of money from the user's bank account, a hold is placed on the bank account. The user may be asked to call a number, email an email address, or follow a prompt on their cell phone to remove the hold by providing some information. By placing the hold on the account, even if the user is unfamiliar with computers or not well-versed in working with online systems, they receive opportunities to prevent harm. For example, when the user cancels the second unauthorized activity, dealing with an unauthorized withdrawal of money from an online account, within the given 30-second window, a hold may be placed on the online account to prevent any harm to the user. The user may remove the hold by calling a given phone number, going through a set of steps, and answering some questions to verify their identity.

To remedy these and other issues, aspects described herein relate to delaying and providing reversibility to important tasks to avoid malicious activity during screen-sharing sessions. A computing device may monitor a first frequency of actions by a first user and via the computing device, to one or more resources over a first time period. The computing device may be a personal computer, a laptop, a tablet, a mobile device, or any proper computing device. For example, the first frequency of actions may be a set of gestures performed by a student, such as entering some information on a university website, clicking on a "register" button on the university website, or like. The one or more resources may be a set of the student's university accounts. The computing device may receive a first request to instantiate a task. The task may be registering for an online course.

The computing device may determine a second frequency of actions conducted by the computing device during access, via the computing device, to the one or more resources over a second time period, wherein the second time period is after the first time period. The second frequency of actions may be a set of new gestures like entering new information, opening or running a new application, accessing different folder irrelevant to the task, or the like. The computing device may determine, based on comparing the first frequency of actions to the second frequency of actions, that the computing device is being used by a second user different from the first user. The second user may be a malicious entity, trying to access some personal information or running applications unrelated to the task. For example, the second user may have accessed some personal information stored on the computing device while the first user was registering for the online course.

Based on the determining that the computing device is being used by the second user different from the first user, and based on a security level associated with the transaction, the set of instructions causes display, via the computing device, a first delay indication that indicates that the transaction is delayed for the first time period. The first delay indication, for example, may be a specific time period during which the first user should wait until the request the first user submitted for the transaction to be completed. The security level is a parameter that may be adjusted based on some preferences. For example, if the task is categorized in a set of important tasks, the securing level may be adjusted accordingly.

The computing device may receive, during the first time period, a user response to the first delay indication. The user response may be a response from the first user, indicating that the first user would like to cancel the task. For example, the student may want to cancel the task of registering for the online course they submitted in the time window, for example, 10 seconds, which is the first delay indication. The first request to instantiate the task may be canceled based on the user response.

The computing device may receive a second request to instantiate a second task. The second task may have the same as the task or may be different. Based on the determining that the computing device is being used by the second user different from the first user, and based on the canceling of the first request, the set of instructions may cause display, via the computing device, of a second delay indication that indicates that the second task is delayed for the second period of time. The second delay indication may be more than the first delay indication. For example, if the first delay indication is for 10 seconds, the second delay indication may be for 20 seconds.

Aspects described herein improve the functioning of computers by providing a method of slowing down transactions conducted by computing devices to prevent malicious (e.g., undesired) actions performed by those computing devices. For example, when a user is using their computing device, the user may share their screen with a legitimately-looking helper. The helper may, in fact, be a malicious entity that tries to gain access to the computing device to install malware on it. The malicious entity may start deleting files from the computing device while the user uses the computing device to renew their public library card. Since the user may overlook the malicious activities of the malicious entity, using the disclosed method may help the user, prevent damages to their computing device.

Aspects described herein could not be performed by a human being, whether mentally or otherwise. For example, when a user uses their computing device and shares their screen with an entity, the entity may abuse the opportunity to access the computing device by performing malicious activities. Examples of malicious activities on the computing device may include installing malware on the computing device, deleting specific files from the computing device, moving a computing virus to the computing device, sending inappropriate content from the computing device to the user's contacts, withdrawing money from the user's saved accounts on the computing device, purchasing merchandises and services from online stores, committing fraudulent activities such as hacking into government agencies, or any combination thereof. The entity may execute any malicious activities mentioned above without the user's knowledge. The user may be an average person who uses the computing device to conduct some everyday tasks, like paying their utility bills. At the same time, the entity is busy committing any of the above-mentioned malicious activities. After getting access to the computing device, the entity may commit any of the above-mentioned malicious activities in the background while the user is busy conducting an everyday task. Therefore, the user may not know that the entity is busy committing abusive actions. Even if the user observes an abnormality on their computing device, the user may not be able to prevent any harm that the abnormality may have caused. For example, the user may notice that while they are busy paying for their electric bill online, they receive an email from an online shop that their order for a piece of jewelry has been received. However, the user may have no knowledge or tools to prevent these kinds of abusive actions. Using the methods disclosed herein may prevent the above-mentioned malicious activities and similar ones that happen to computing devices.

Before discussing these concepts in greater detail, however, several examples of a computing device that may be used in implementing and/or otherwise providing various aspects of the disclosure will first be discussed with respect to FIG. 1.

FIG. 1 illustrates one example of computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, computing devices 101, 105, 107, 109, and others may operate in concert to provide parallel computing features in support of the operation of control logic 125 and/or machine learning software 127.

FIG. 1 also shows that the computing device 101 may comprise Hardware Security Module (HSM) 132 and/or Quantum Random Number Generator (QRNG) 133. In FIG. 1, HSM 132 may comprise any computing module (e.g., one or more computer chips, attached cards, or the like) which may be capable of managing secrets, performing encryption and/or decryption, and/or otherwise performing security- and/or authentication-related functions. In FIG. 1, HSM 132 may comprise, for instance, one or more secure cryptoprocessor chips which are capable of performing cryptographic operations. In FIG. 1, QRNG 133 may comprise any computing module (e.g., one or more computer chips, attached cards, or the like) capable of generating a random number. Such a random number might be generated using quantum methods which permit the random number to have a high degree of entropy.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
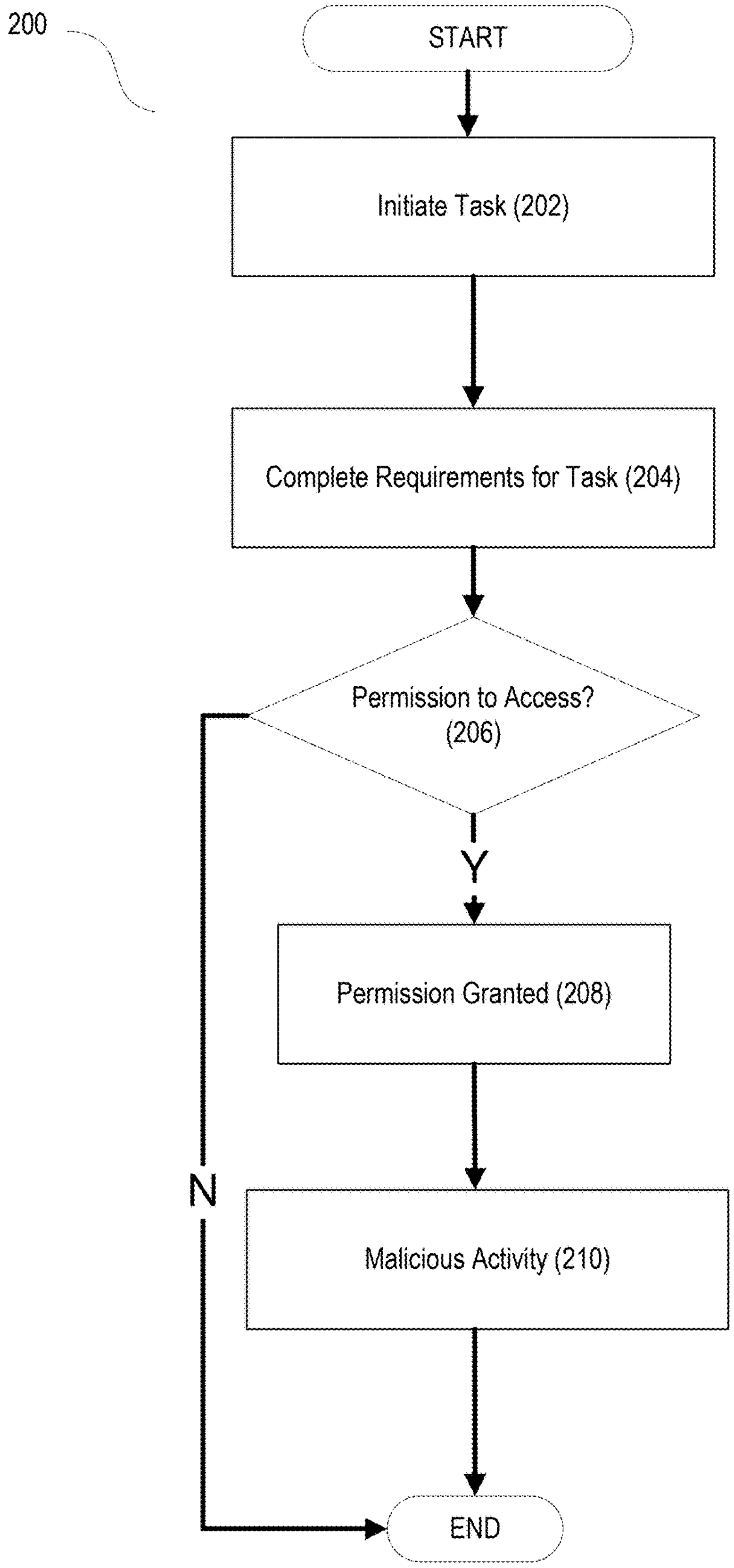
FIG. 2 depicts an example for conducting a task according to one or more aspects of the disclosure.

FIG. 2 depicts a method 200 comprising different steps for conducting a task for a user. The interface is displayed on a display device, in which the user may enter relevant information for the task, request and receive some help for completing the task, and finalize the task. The interface may be displayed on a personal electronic device, for example, a mobile device, a personal computer, a laptop, or a publicly accessible computer or electronic device. The steps in FIG. 2 may be performed by a computing device, such as any one of the devices described with respect to FIG. 1. The steps shown in FIG. 2 are illustrative, and may be re-arranged, omitted, and/or modified as desired. A computing device may comprise one or more processors and memory storing instructions that, when executed by the one or more processors, cause the performance of one or more of the steps depicted in FIG. 2. One or more non-transitory computer-readable media may store instructions that, when executed, cause the performance of one or more of the steps depicted in FIG. 2.

At step 202, the user may initiate the task by entering relevant information and/or selecting displayed options. The relevant information may include specifics related to the user, a username, a password, a key code received via their mobile device, a pre-issued transaction code authorizing the task, or a combination thereof. Selecting a displayed option may include clicking on a button, selecting an option from a plurality of options for the task, or a combination thereof. In some examples, the user may click on a displayed agreement message to authorize the task. The displayed option may ask the user questions, for instance, whether the user wants to delete a specific file. In some examples, there may be different timelines associated with the task. The user may have some preferences regarding the timeline for uploading a file. For example, the user may want to upload a specific file to a remote server at a particular time and date. For example, the user may be a student who needs to upload a completed take-home exam before a predetermined deadline. The user may be asked to select their desired timeline for uploading the file. As another example, the user may be a resident who wants to pay their electric bill on a utility company website. The user may be given different options for paying their electric bill, each with a specific cost and timeline for processing the payment. The resident may select an expensive, but fast method of payment for their electric bill, depending upon their needs.

At step 204, the customer may complete the requirements for the task. Different options and fillable forms may be displayed for the user to complete. For example, the user may be asked to enter some details in certain displayed forms. Details may include, for example, entering or selecting a specific file in a folder on their computing device, selecting a photo in their cloud storage for a post-processing application, or providing an address for a file to upload. Completing the requirements may include asking the user's permission to confirm conducting the task. For example, the user may be asked to click on a button that reads "OK," or to enter a one-time PIN code, or to follow a specific prompt to show the user's consent, or a combination thereof.

At step 206, an interface may be displayed for the user, through which the user may give permission to a second user to access the user's computing device. For example, the user may need assistance evaluating different displayed options, and the user may give permission to the second user to help the user in assessing different options. The second user may be a legitimate helper who intends to help the user. Unbeknownst to the user, the second user, in some instances, may be a malicious entity who intends to install malware on the user's computing device after getting access to the user's computing device. To deceive the user that the second user is a legitimate helper, the second user may use, for example, an icon that appears to be associated with a well-recognized organization. As another example, the second user may use an avatar that looks legitimate to the user as something legitimate associated with a known company. After getting access to the computing device, the second user may intend to commit malicious activities such as deleting certain files or photos, stealing some personal information, sending a computer virus to contacts of the user, accessing different financial accounts of the user, manipulating the health information of the user, or sending inappropriate content to the user's friends. As another example, the user may unwillingly or, through a mistake, give permission to the second user to access the user's computing device.

The user may give permission through the interface. If the user gives permission to the second user to access the user's computing device, the method proceeds to step 208, in which permission is granted. The user may decline to grant permission to access the user's computing device. If the user declines to give permission to access the user's computing device, the method ends.

After permission is granted to the second user, the second user may commit malicious activities at step 210. The second user may be a malicious entity or a hacker who intercepts the user's online accounts. The malicious entity may pretend to be a legitimate helper when the user gives permission to access the user's computing device. The malicious entity may hack into the user's online account remotely. The malicious entity may send a prompt or display a graphical user interface on the user's display to deceive the customer to select the prompt or interact with the malicious entity. The malicious entity may ask for the user's personal information, pretending that the malicious entity needs the user's personal information to help the user. The malicious entity may send messages to the user to convince the user that the malicious entity is a legitimate helper and that the malicious entity, for example, can expedite an assignment for the user and save the user's time. The malicious entity may send a message to the user, asking the user to enter a password associated with one of the user's accounts. The malicious entity may implement different strategies to look legitimate to the user so the malicious entity can receive the user's trust. The malicious entity may send a prompt to be shown on the user's display. If the malicious entity gets control over the user's computing device, the malicious entity, unbeknownst to the user, may execute some malicious activities such as deleting some files, sending some inappropriate content to the user's contacts, or posting some personal photos of the users to social media. The malicious entity may add themselves to the user's accounts as an authorized user of the user's accounts. After controlling the user's account, the malicious entity may change some of the user's account settings. The malicious entity may change the user's account password before the user can stop changing the password. After getting control over the user's account, the malicious entity may change the details associated with the user's pending tasks, for example.

Figure 3:
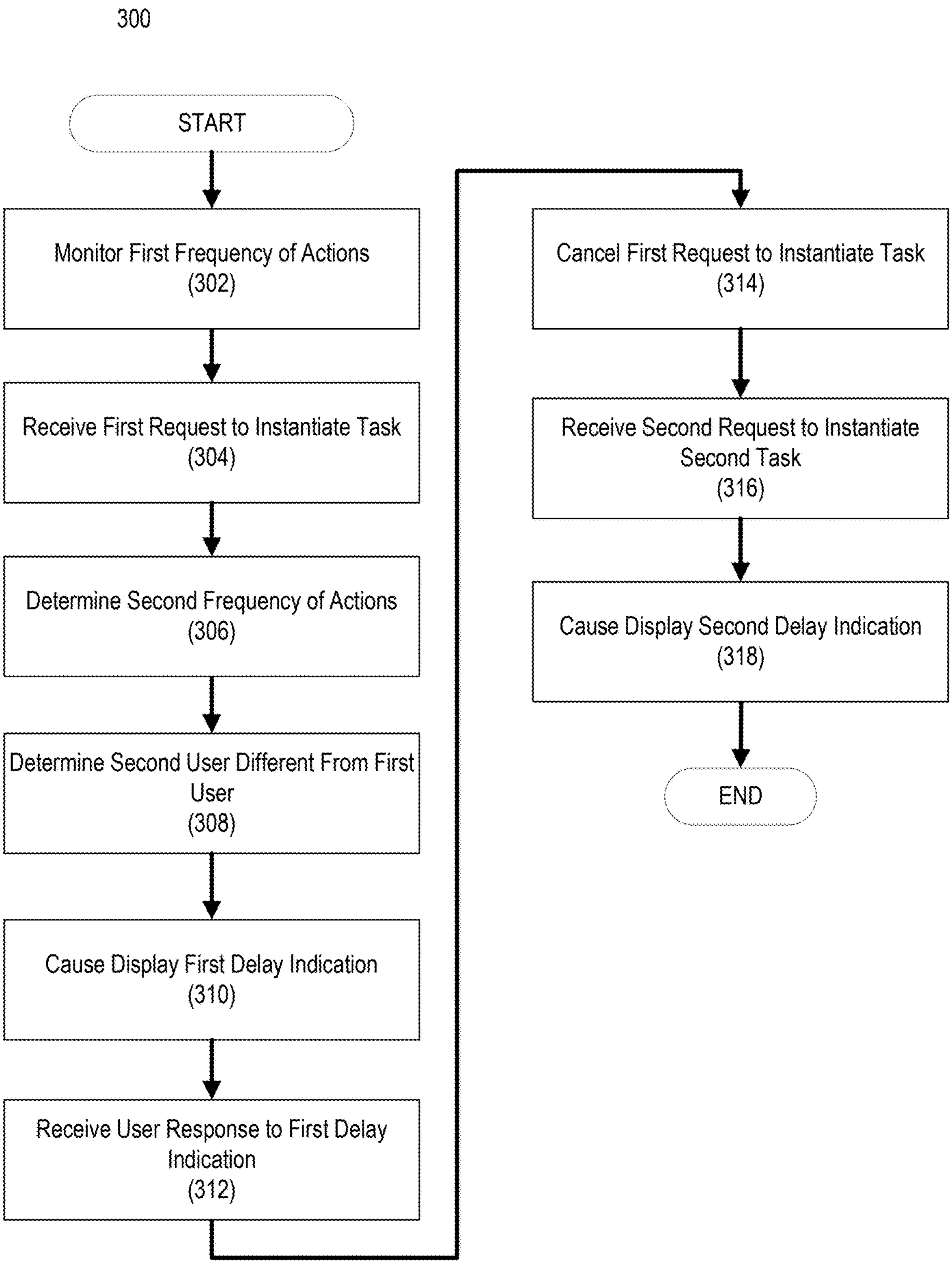
FIG. 3 depicts an example method comprising different steps for delaying and providing reversibility to important tasks to avoid malicious activity during screen sharing sessions.

FIG. 3 depicts an example method comprising different steps for delaying and providing reversibility to important tasks to avoid malicious activity during screen sharing sessions. One, some, or all steps described in FIG. 3 may be performed by one or more computing device 101 or devices 105, 107, or 109 in FIG. 1. Steps may be performed out of order and/or may be repeated throughout the method.

At step 302, the user's computing device may monitor a first frequency of actions conducted by the computing device during access, by a first user and via the computing device, to one or more resources over a first time period. The computing device may be computing device 101 shown in FIG. 1, or any of devices 105, 107, or 109 shown in FIG. 1. The computing device may be in communication with an entity. The entity, for example, may be server. The first frequency of actions, for example, may comprise use of one or more functions of an application. In some other examples, the first frequency of action may comprise access to one or more pages of a website. As another example, the first frequency of actions may comprise requests to access data associated with the first user. The first frequency of actions may comprise a combination of any of the examples given above. The first user may be the user who conducts a task, as explained in FIG. 2. The one or more resources, for example, may be one or more accounts in different utility companies. The first frequency of actions may be one or more gestures performed by the first user on the computing device or in connection with the computing device. Gestures may include entering a number, a letter, or a string of letters, selecting an option from a drop-down menu, selecting an option displayed by the computing device, giving input to the computing device via a virtual reality device, or any combination thereof. Monitoring the first frequency of actions may be, for example, through running an application that logs keystrokes. As another example, monitoring the first frequency of actions may be through using an application to monitor mouse movements and identify instances when files are accessed, deleted, or created using an operating system. As a further example, monitoring the first frequency of actions may be through monitoring web browsing activity using an internet browser plugin. The first time period may be adjusted, based on some preferences. The first time period may be adjusted to be below a threshold. For example, the first time period may be adjusted to be less than 10 minutes. In some other examples, the first time period may be adjusted if the first user asks for an extension of time to complete the first frequency of actions.

At step 304, the computing device receives a first request to instantiate a task. In some examples, the request to instantiate the task may be received based on interaction, via the computing device, with a user interface element. The task may be any of the nonlimiting examples mentioned above such as registering for a course offered online on a university website. The first request may be initiating the transaction, as explained at step 202 in FIG. 2. After receiving the request, the computing device may cause displaying a message to the first user, informing the first user that the first request has been received by the computing device and the first request will be processed accordingly.

At step 306, the computing device may determine a second frequency of actions conducted by the computing device during access, via the computing device, to the one or more resources over a second time period, wherein the second time period is after the first time period. The second frequency of actions may be one or more actions that can be detected by the computing device. The one or more actions may be selecting an option caused to be displayed by the computing device, moving a mouse cursor over a graphical user interface caused to be displayed by the computing device, entering a letter or a string of letters, or any combination thereof. The second frequency of actions may be use of one or more functions of a computer program or access to one or more pages of a hyperlink. According to one example, the second time period, that is, after the first time period, may be shorter than the first time period. According to another example, the second time period, that is after the first time period, may be longer than the first time period. As another example, the second time period, after the first time period, may be equal to the first time period.

At step 308, based on comparing the first frequency of actions to the second frequency of actions, the computing device may determine that the computing device is being used by a second user different from the first user. For example, the computing device may create profiles for users that typically access the computing device. The computing device, for example, may record a specific user who usually uses the computing device in a remote setting. The computing device may, for instance, detect the IP address of the computer of a person who usually connects to the computing device through a remote connection. The computing device may have corroborated the authenticity of users who use the computing device. For example, the computing device may verify that three family members may use the computing device, each member with a different registered profile.

According to some examples, in determining that the computing device is being used by the second user differently from the first user, the computing device may determine that the second user is using the computing device via a remote access session that permits the second user to provide remote input to the computing device. The remote access session may be a remote connection through which the second user has gained access to the computing device. The computing may detect the remote session, for example, when a mouse cursor is moving, whereas a USB-connected mouse device does not move. The computing device may detect the remote session, for instance, when the computing device determines some executables on the computing device. The computing device may detect the remote session, for example, when a microphone associated with the computing device is active while the microphone is not normally used in conjunction with the task. As another example, the computing device may detect the remote session by determining an abnormal CPU or RAM usage of the computing device.

According to some examples, in determining that the computing device is being used by the second user different from the first user, the computing device may determine a first pattern of input device usage during the first time period. Also, the computing device may determine a second pattern of input device usage during the second time period. The computing device may compare the first pattern of input device usage and the second pattern of input device usage. The computing device may use different strategies to determine patterns. For example, the computing device may, based on the speed of input device usage, determine a pattern. In another example, the computing device, based on the type of activity in the first time period and in the second time period, may determine a pattern. For example, the computing device may determine that in the first time period, registering for online classes has been the focus of using the computing device, while in the second time period, withdrawing money from an account is the focus of using the computing device. The computing device, for example, may determine a pattern based on the type of inputs received during the first and second periods. For example, the computing device may determine that during the first time period, the inputs are from a wired keyboard connected through a wired connection to the computing device, whereas during the second time period, the computing device received inputs through a remote connection.

According to some examples, in determining that the computing device is being used by the second user differently from the first user, the computing device may determine a first pattern of resources of the one or more resources accessed during the first time period. Further, the computing device may determine a second pattern of resources, of the one or more resources, accessed during the second time period. The computing device may compare the first pattern of resources and the second pattern of resources. For example, the first pattern of resources, of the one or more resources, may be a set of utility accounts used for paying utility bills. The second pattern of resources, for example, may be a set of personal accounts such as email accounts and grocery shopping accounts used for mundane matters. In comparing the first pattern of resources and the second pattern of resources, for example, the computing device may compare the set of utility accounts and the set of personal accounts.

At step 310, the computing device, based on the determining that the computing device is being used by the second user different from the first user, and based on a security level associated with the transaction, cause display a first delay indication. The first delay indication indicates that the transaction is delayed for the first time period. According to some examples, the computing device may determine the first time period based on the security level associated with the task. The first delay indication, for example, may comprise a modification of the user interface element to depict that the task is delayed for the first time period. The security level associated with the task may be adjusted based on the type of task. For example, for tasks that deal with financial transactions, a higher security level is assigned than that of registering for university courses. The security level may be adjusted based on the amount of transactions, for example, if the task deals with online shopping. If, for example, the amount for an online purchase is less than 10 dollars, a lower security level may be triggered. However, if the amount of an online purchase is more than 100 dollars, a higher security level may be triggered.

The first delay indication, for example, may appear as a message, notifying the first user that the task is delayed for the first time period. In some examples, the message may be displaying a text box on the user interface element, pushing a notification in an alert form on the user interface element, changing color of a portion of the user interface element, displaying a highlighted message on the user interface element, or any combination thereof.

At step 312, the computing device may receive, during the first time period and via the computing device, a user response to the first delay indication. According to an example, the user response may be recorded via clicking on a message or a button. According to another example, the user response may be recorded through a text box, in which the first user types a letter or a string of letters. In some examples, the user response may be recorded or received through an input device that is connection with the computing device.

At step 314, the computing device, based on the user response, may cancel the first request to instantiate the task. The user response may be a request to cancel the first request to instantiate the task. The user response may be received by receiving an input from the first user, indicating that the first user wishes to cancel the first request. The user response to cancel the first request may be received in different ways, for example, through a mouse click on a cancel button, via a text box in which the word “cancel” may be inserted, or any proper means that may manifest the desire of the first user to cancel the first request. At step 314, the first user may be able to cancel the first request. The second user may not be able to cancel the first request. The second user may be the fraudster explained above in connection with FIG. 2.

Although the task may be canceled, the computing device, for example, may save a record of information entered for conducting the task. The computing device, for instance, may create a history of tasks canceled. According to an example, after canceling the task, the computing device may add the canceled task to a list of canceled tasks. According to another example, the computing device may provide some of the information entered in conducting the task for later use. If the task sends a text message to a certain number of people, canceling the task may include deleting the text message from a text box or unsending the text message. If the task makes several copies of a specific file, canceling the task may include locking the file for a certain amount of time.

Although the task may be canceled, the computing device, for example, may save a record of information entered for conducting the task. The computing device, for instance, may create a history of tasks canceled. According to an example, the computing device may add the canceled task to a list of canceled tasks after canceling the task. According to another example, the computing device may provide some information entered in conducting the task for later use. If the task sends a text message to a certain number of people, canceling the task may include deleting the text message from a text box or unsending the text message. If the task makes several copies of a specific file, canceling the task may include locking the file for a certain amount of time.

At step 318, the computing device, based on the determining that the computing device is being used by the second user different from the first user, and based on the canceling of the first request, may cause display of a second delay indication. The second delay indication may indicate that the second task is delayed for the second time period. According to one example, the second time period is longer than the first time period. For example, the second time period to cancel the second request may be 20 seconds, whereas the first time period to cancel the first request may be 10 seconds. The computing device may, based on a predetermined formula, determine the second time period. For example, the computing device may, after the first time period, increase the following time periods in steps of 30 seconds. According to another example, the computing device may, after the first time period, increase the following time periods based on a set of preferences.

If the first user cancels the second task within the second time period, the computing device may send a message to the first user, asking the first user to contact the entity where one or more resources exist. The message may ask the first user to contact the entity to verify the first user is an authorized user before the second task can be completed or the hold can be lifted. For example, the first user may be asked to send an email to the entity with scanned copies of their identification documents like a driving license, a passport, or any proper government-issued identification card. As another example to verify the identity of the first user, the first user may be asked to call a specific number and provide some personal information such as date of birth, prior mailing addresses, prior names (if any), responses to some security questions or any proper way of identity verification. Also, the first user may be asked to say or enter a code received via their mobile devices during their call to the financial institution. It will be understood that different methods may be implemented to verify the identity of the first user. The entity may be a third party responsible for verifying the authenticity of the first user. After confirming the authenticity of the first user, the third party may remotely unlock the computing device, allow the following tasks to be conducted, or lift the hold.

One of the advantages of placing the hold on the second task or generally the accounts of the first user is to prevent the second user, for example, the malicious entity mentioned above concerning FIG. 2, from saving the account information of the first user. One of the other advantages of placing a hold on the accounts of the first user is to prevent the second user, the malicious entity, for example, from interfering with the first user's accounts when the first user cannot see in the background.

Figure 4:
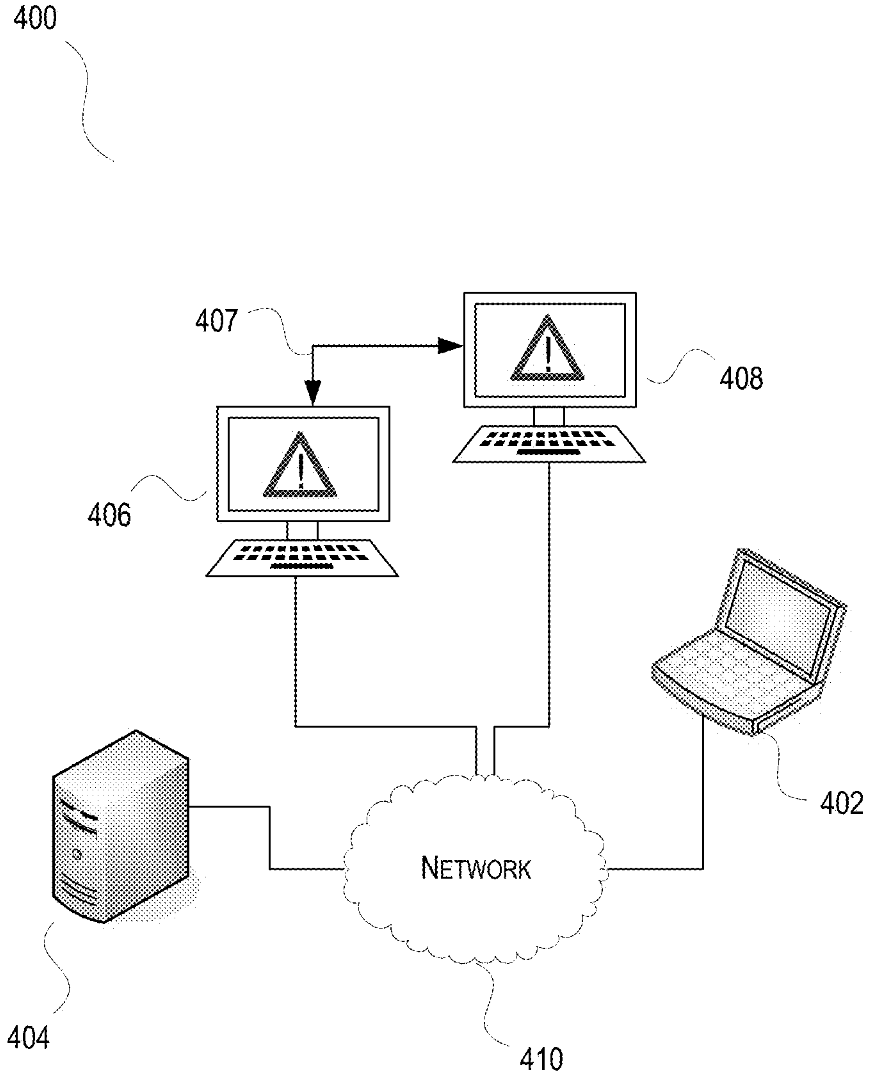
FIG. 4 depicts an example of a computing device and malicious entities that try to penetrate the computing device.

FIG. 4 depicts an example of computing device 402 and malicious entities, i.e., device 406 and device 408, that try to penetrate computing device 402. In FIG. 4, computing device 402 may be a personal computer, a desktop computer, a laptop, a tablet, a mobile device, a smartphone, and/or any other type of data processing device. Computing device 402 may be similar to computing 101 in FIG. 1. A user may use computing device 402 to conduct a task. For example, the user may use computing device 402 to access a community college website and register for an online course. As another example, the user may use computing device 402 to pay their utility bills. According to another example, the user may use computing device 402 to submit their class projects via their university website.

In FIG. 4, computing device 404 may be a server controlled and maintained by a third party. For example, computing device 404 may be a server that hosts the website of a utility company. According to another example, computing device 404 may be a server of an academic institution that provides online courses for students. In some instances, computing device 404 may include a plurality of servers placed in one geographical location or distributed in more than one location. For example, computing device 404 may include two servers, one in Ashburn, Virginia, and the other in Austin, Texas. The plurality of servers may seamlessly communicate with each other to provide services, for example, maintaining and hosting a website or a portal for a utility company or providing services for the user of computing device 402. Computing device 404 may be a server that is shared between several entities. For example, computing device 404 may be a server that maintains a website for a local college and hosts a website for a warehouse.

In FIG. 4, device 406 and device 408 may be a set of computers that are used by one or more than one malicious entity. For example, device 406 may be used by a first malicious entity, and device 408 may be used by a second malicious entity. Devices 406 and 408 may abuse a shared session with computing device 402. For example, the user of computing device 402 may give permission to device 406 and/or device 408 to gain control over the computing device 402 in a shared session, and device 406 and device 408 may be used for performing malicious activities on computing device 402. Device 406 and device 408 may be similar to computing device 101, as explained in FIG. 1. Device 406, for example, may be a public computer placed in a public library. Device 406 may be a server controlled by the first malicious entity, and device 408 may be a tablet controlled by the second malicious entity. Devices 406 and 408 may be used and controlled by one malicious entity. For example, a hacker may control both device 406 and device 408. Device 406 and device 408 may be in different geographical locations. For example, device 406 may be located in Tempe, Arizona, USA, while computing device 408 is in Berlin, Germany. Device 406 and device 408 may communicate via channel 407. According to an example, channel 407 may be the Internet. According to another example, channel 407 may be a specially designed communication channel used by the first and second malicious entities to transfer data between device 406 and device 408. In some instances, channel 407 may be a wired connection between device 406 and device 408. According to another example, channel 407 may be a local area network (LAN) that may have one or more known LAN topologies and may use one or more of a variety of protocols, such as Ethernet.

To conduct malicious activity on computing device 402, device 406 and device 408 may work collaboratively to perform their malicious activity according to a predetermined plan. For example, the first malicious entity, controlling device 406, may push a legitimately looking text box to device 402. The first malicious entity may have designed the text box in such a way as to gain the trust of the user of device 402. The first malicious entity, controlling device 406, may convince the user of device 402 to share some user's personal information with the first malicious entity through the text box. The personal information may include mailing addresses, passwords of the user's email addresses, the user's date of birth, social security number, credit card information, PIN codes for debit cards, or the like. After receiving the user's personal information, the first malicious entity may send the acquired personal information to the second malicious entity. The second malicious entity may use the received personal information to resume the predetermined plan by, for example, hacking into the user's accounts.

In FIG. 4, network 410 may be a channel through which computing device 402 communicates with computing device 404. Network 410 may be similar to network 103, as explained in FIG. 1. For example, network 410 may be the Internet. In some examples, network 410 may be private intranets, corporate networks, LANs, wireless networks, personal networks (PANs), and the like. Device 406 and device 408 may use network 410 to penetrate to computing device 402. Device 406 and device 408 may communicate through network 410. Network 410 may be an unsecured wireless network through which unauthorized users may access the Internet, for example. For example, network 410 may be a WIFI Internet connection accessible to the public in an airport.

Figure 5:
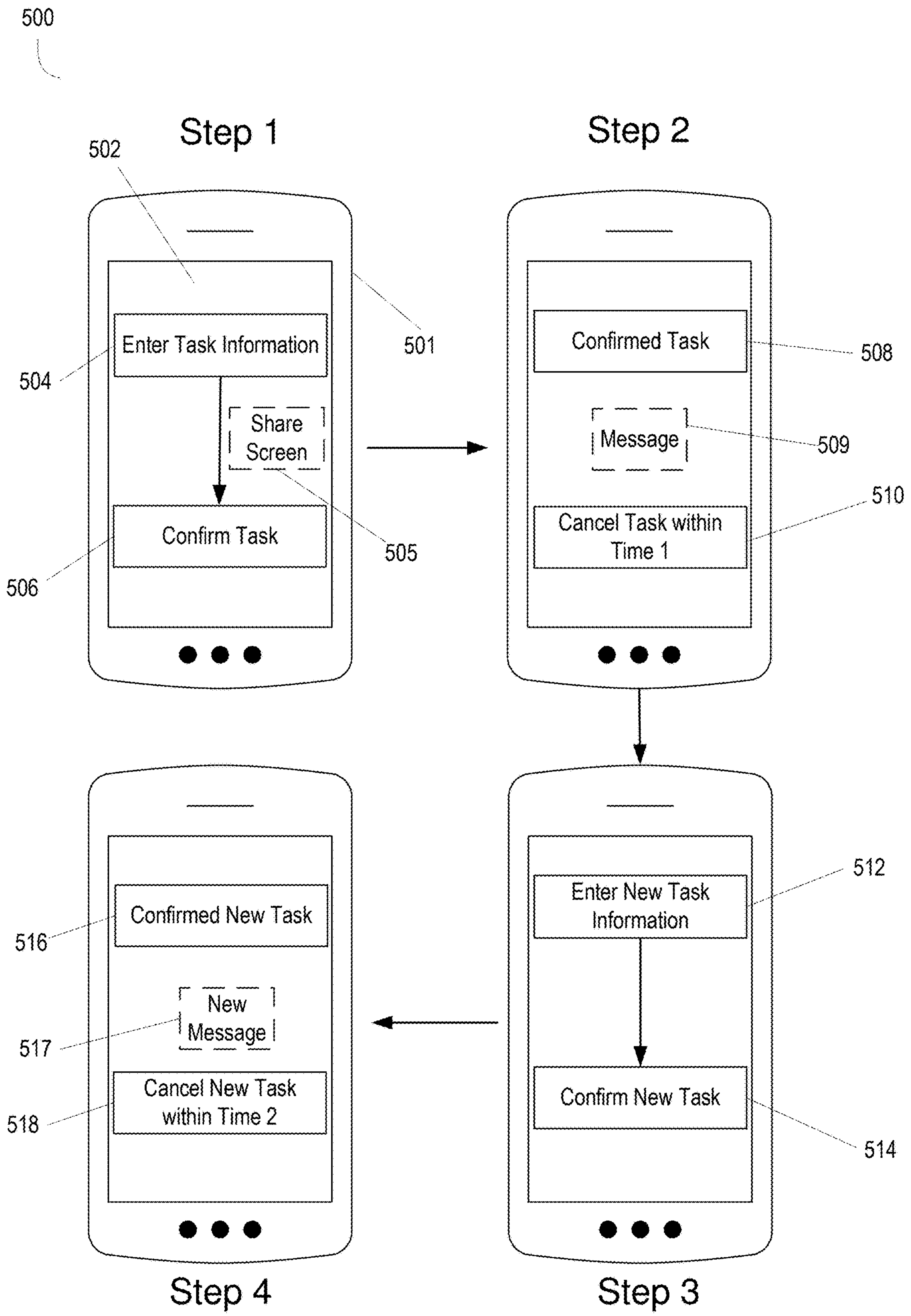
FIG. 5 depicts an example for a graphical user interface displayed on a user computing device.

FIG. 5 depicts an example of four different graphical user interfaces displayed on a user computing device to conduct tasks. Particularly, FIG. 5 depicts various different steps that may be implemented using various user interfaces. In FIG. 5, a user may work with computing device 501. Computing device 501 may be a personal computer, a laptop, a smartphone, a mobile device, a tablet, or any proper computing device that provides a computing facility for the user to conduct a task. Computing device 501 may be similar to computing device 101, as explained in FIG. 1. Computing device 501 may be equipped with display 502. Display 502 may be any proper display for interacting with computing device 501. For example, display 502 may be a touch display, an LCD, an LED, a CRT monitor, an ink-based display, or a combination thereof.

In FIG. 5, at step 1, the user may enter information for conducting a task in box 504. Box 504 may include designed graphics with options that may guide the user to enter information. For example, box 504 may include a drop-down menu for easy selection. As another example, box 504 may include an interface for asking for help or sharing screens. Task information may include all information pertinent to conducting the task, dependent upon the type of task and complexities associated with the task. For example, if the user is a student and intends to register for a course through their university website, the user may need to enter information such as their student identification number, their email address, their desired semester, and details associated with the course. If the user is a resident who intends to pay their electric bill via an electric utility company website, the user may need to enter relevant account information such as their username, their password, an amount to be paid, and specify from which of their bank accounts or credit cards the user intends to pay the bill.

In FIG. 5, the user may see box 505, where the user may share their display 502 with an entity. The entity may be a malicious entity. The malicious entity may commit malicious activities on computing device 501. For example, the malicious entity may move some files from computing device 501 to a hidden folder. As another example, the malicious entity may delete some files stored on computing device 501. In some instances, the malicious entity may withdraw money from the user's account saved on computing device 501.

In FIG. 5, the user may confirm conducting the task in box 506. Box 506 may be a button that reads, "OK," "submit," "acknowledge," or "confirm." According to some examples, box 506 may read terms that convey that the user may submit their request to conduct the task. After the user clicks box 506, display 502 may show what is shown in step 2.

In FIG. 5, at step 2, the user may see box 508, in which the user is informed that the task submitted in the previous step has been confirmed. The user may see box 509, in which the user is notified that an unauthorized activity has been detected on computing device 501. The message may be based on the unauthorized activity and a security level associated with the task. For example, the task of registering for an online course may have a lower security level than the task of transferring money. As another example, paying an electric bill online may have a higher security level than posting a photo on a social media website.

The user may see box 510, in which the user has been given the option to cancel the task submitted in the last step within a first time period. For example, the user may be informed that the user may cancel the task within the next 10 seconds. A timer, not shown in FIG. 5, may also be displayed on display 502 so that the user is aware of their time. For example, if the user is given an option in box 510 to cancel the task, the user may see a time that counts down from 10 seconds to 0 seconds in one-second steps. According to another example, if the user is given an option to cancel the task within 30 seconds, the timer may count in 5-second steps. If the user cancels the task within the specified time, for example, 10 seconds, display 502 may show what is shown in step 3. The first time period may be based on the unauthorized activity and/or the security level associated with the task. For example, for withdrawing money from an account, the first time period may be 20 seconds, while for submitting a class project, the first time period may be 40 seconds.

In FIG. 5, at step 3, box 512 may be shown in display 502. Box 512 may allow the user to conduct a new task by entering new information into the new task. The new task may be the same as the task in step 1. According to an example, the new task is different from the task in step 1. Box 512 may ask the user to provide new information, unlike the information that the user entered in box 504. In some instances, the new information the user may enter in box 504 may have some overlap with the information the user entered in box 504. For example, if the user entered his electric meter information in box 506 to pay for their electric bill and then canceled their payment method, the user may not need to enter the same information in box 512 as computing device 501 has recorded the electric meter information. According to some examples, the user may need to re-enter the information that the user entered in box 504 at step 1. For instance, if a particular task is associated with entering some important information such as social security number, the user may need to enter their social security number every time, regardless of whether the user entered that critical information in the previous steps. After the user enters the new information for the new task in box 512, the user may need to confirm their approval for the new task in box 514. According to an example, box 514 may be similar to box 506. According to another example, box 514 may be different from box 506. After the user confirms the new task in box 514, display 514 may show what is shown in step 4. At step 3, the user may still have their display 502 shared with the entity.

In FIG. 5, at step 4, box 516 may inform the user that the new task has been received and is being processed. Box 516 may inform the user that the new task is confirmed. According to an example, box 517 may be shown on display 502. Box 517 may notify the user of a new message. The new message may inform the user that because of the detection of suspicious activity, the user may cancel the new task within a second time period. The suspicious activity may be a continuation of the unauthorized activity detected in step 2. The suspicious activity may be a new unauthorized activity. The second time period may be based on a new security level associated with the new task.

According to an example, box 518 may inform the user that the user may cancel the new task within the second time period. For example, the second time period may be longer than the first time period. According to an example, if the first time period was 10 seconds, the second time period may be 30 seconds. A timer, not shown in FIG. 5, may be displayed in step 4 to inform the user how much time is left if the user would like to cancel the second task. According to an example, if the user clicks on box 518 within the second time period or selects the cancel option shown in box 518, the user may see a note to contact an entity. The entity may be a utility company, a university, a bank, a government agency, or an organization that is associated with conducting tasks. For example, if the user wants to pay a gas bill on a utility company's website, and the user cancels the payment task twice, then the user may be asked to contact customer support of the utility company to verify their identity.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device configured to delay and provide reversibility to threshold-value electronic transactions each exceeding a threshold value to avoid fraud during screen sharing sessions, the computing device comprising:

one or more processors; and memory storing instructions that, when executed by the one or more processors, cause the computing device to:

monitor a first frequency of actions conducted by a second computing device during access, by a first user and via the second computing device, to one or more resources over a first time period;

receive, from the second computing device, a first request to instantiate a transaction;

determine a second frequency of actions conducted by the second computing device during access, via the second computing device, to the one or more resources over a second time period, wherein the second time period is after the first time period;

determine, based on comparing the first frequency of actions to the second frequency of actions, that the second computing device is being used by a second user different from the first user;

based on the determining that the second computing device is being used by the second user different from the first user, and based on a security level associated with the transaction, cause display, via the second computing device, of a first delay indication that indicates that the transaction is delayed for the first time period;

receive, during the first time period and via the second computing device, a user response to the first delay indication;

based on the user response, cancel the first request to instantiate the transaction;

receive, from the second computing device, a second request to instantiate a second transaction; and based on the determining that the second computing device is being used by the second user different from the first user, and based on the cancelation of the first request, cause display, via the second computing device, of a second delay indication that indicates that the second transaction is delayed for the second time period.

2. The computing device of claim 1, wherein the instructions, when executed by the one or more processors, cause the computing device to determine that the second computing device is being used by the second user different from the first user by causing the computing device to:

determine that the second user is using the second computing device via a remote access session that permits the second user to provide remote input to the second computing device.

3. The computing device of claim 1, wherein the instructions, when executed by the one or more processors, cause the computing device to determine that the second computing device is being used by the second user different from the first user by causing the computing device to:

determine a first pattern of input device usage during the first time period;

determine a second pattern of input device usage during the second time period; and compare the first pattern of input device usage and the second pattern of input device usage.

4. The computing device of claim 1, wherein the instructions, when executed by the one or more processors, cause the computing device to determine that the second computing device is being used by the second user different from the first user by causing the computing device to:

determine a first pattern of resources, of the one or more resources, accessed during the first time period;

determine a second pattern of resources, of the one or more resources, accessed during the second time period; and compare the first pattern of resources and the second pattern of resources.

5. The computing device of claim 1, wherein the instructions, when executed by the one or more processors, cause the computing device to:

determine the first time period based on the security level associated with the transaction.

6. The computing device of claim 1, wherein the first request to instantiate the transaction is received based on interaction, via the second computing device, with a user interface element, and wherein the first delay indication comprises a modification of the user interface element to depict that the transaction is delayed for the first time period.

7. The computing device of claim 1, wherein the first frequency of actions comprises one or more of:

use of one or more functions of an application;

access to one or more pages of a website; or requests to access data associated with the first user.

8. A method for delaying and providing reversibility to threshold-value electronic transactions each exceeding a threshold value to avoid fraud during screen sharing sessions, the method comprising:

monitoring a first frequency of actions conducted by a computing device during access, by a first user and via the computing device, to one or more resources over a first time period;

receiving, from the computing device, a first request to instantiate a transaction;

determining a second frequency of actions conducted by the computing device during access, via the computing device, to the one or more resources over a second time period, wherein the second time period is after the first time period;

determining, based on comparing the first frequency of actions to the second frequency of actions, that the computing device is being used by a second user different from the first user;

based on the determining that the computing device is being used by the second user different from the first user, and based on a security level associated with the transaction, causing display, via the computing device, of a first delay indication that indicates that the transaction is delayed for the first time period;

receiving, during the first time period and via the computing device, a user response to the first delay indication;

based on the user response, canceling the first request to instantiate the transaction;

receiving, from the computing device, a second request to instantiate a second transaction; and based on the determining that the computing device is being used by the second user different from the first user, and based on the canceling of the first request, causing display, via the computing device, of a second delay indication that indicates that the second transaction is delayed for the second time period.

9. The method of claim 8, wherein the determining that the computing device is being used by the second user different from the first user comprises:

determining that the second user is using the computing device via a remote access session that permits the second user to provide remote input to the computing device.

10. The method of claim 8, wherein the determining that the computing device is being used by the second user different from the first user comprises:

determining a first pattern of input device usage during the first time period;

determining a second pattern of input device usage during the second time period; and comparing the first pattern of input device usage and the second pattern of input device usage.

11. The method of claim 8, wherein the determining that the computing device is being used by the second user different from the first user comprises:

determining a first pattern of resources, of the one or more resources, accessed during the first time period;

determining a second pattern of resources, of the one or more resources, accessed during the second time period; and comparing the first pattern of resources and the second pattern of resources.

12. The method of claim 8, further comprising:

determining the first time period based on the security level associated with the transaction.

13. The method of claim 8, wherein the first request to instantiate the transaction is received based on interaction, via the computing device, with a user interface element, and wherein the first delay indication comprises a modification of the user interface element to depict that the transaction is delayed for the first time period.

14. The method of claim 8, wherein the first frequency of actions comprises one or more of:

use of one or more functions of an application;

access to one or more pages of a website; or requests to access data associated with the first user.

15. One or more non-transitory computer-readable media storing instructions that, when executed, cause:

monitoring a first frequency of actions conducted by a computing device during access, by a first user and via the computing device, to one or more resources over a first time period;

receiving, from the computing device, a first request to instantiate a transaction;

determining a second frequency of actions conducted by the computing device during access, via the computing device, to the one or more resources over a second time period, wherein the second time period is after the first time period;

determining, based on comparing the first frequency of actions to the second frequency of actions, that the computing device is being used by a second user different from the first user;

based on the determining that the computing device is being used by the second user different from the first user, and based on a security level associated with the transaction, causing display, via the computing device, of a first delay indication that indicates that the transaction is delayed for the first time period;

receiving, during the first time period and via the computing device, a user response to the first delay indication;

based on the user response, canceling the first request to instantiate the transaction;

receiving, from the computing device, a second request to instantiate a second transaction; and based on the determining that the computing device is being used by the second user different from the first user, and based on the canceling of the first request, causing display, via the computing device, of a second delay indication that indicates that the second transaction is delayed for the second time period.

16. The one or more non-transitory computer-readable media of claim 15, wherein the determining that the computing device is being used by the second user different from the first user comprises:

determining that the second user is using the computing device via a remote access session that permits the second user to provide remote input to the computing device.

17. The one or more non-transitory computer-readable media of claim 15, wherein the determining that the computing device is being used by the second user different from the first user comprises:

determining a first pattern of input device usage during the first time period;

determining a second pattern of input device usage during the second time period; and comparing the first pattern of input device usage and the second pattern of input device usage.

18. The one or more non-transitory computer-readable media of claim 15, wherein the determining that the computing device is being used by the second user different from the first user comprises:

determining a first pattern of resources, of the one or more resources, accessed during the first time period;

determining a second pattern of resources, of the one or more resources, accessed during the second time period; and comparing the first pattern of resources and the second pattern of resources.

19. The one or more non-transitory computer-readable media of claim 15, wherein the instructions, when executed, further cause:

determining the first time period based on the security level associated with the transaction.

20. The one or more non-transitory computer-readable media of claim 15, wherein the first request to instantiate the transaction is received based on interaction, via the computing device, with a user interface element, and wherein the first delay indication comprises a modification of the user interface element to depict that the transaction is delayed for the first time period.

* * * * *